US006241460B1

(12) United States Patent
Werner

(10) Patent No.: US 6,241,460 B1
(45) Date of Patent: Jun. 5, 2001

(54) OFFSET SORTER FOR ENVELOPES

(76) Inventor: Todd C. Werner, 1400 49th Ave. NE., St. Petersburg, FL (US) 33703

( * ) Notice: Subject to any disclaimer, the term of this patent is extended or adjusted under 35 U.S.C. 154(b) by 0 days.

(21) Appl. No.: 09/385,496

(22) Filed: Aug. 27, 1999

(51) Int. Cl.[7] .................................................... B65G 57/32

(52) U.S. Cl. .................................... 414/798.2; 414/791.2; 209/698; 209/703; 209/11.5; 198/456

(58) Field of Search .............................. 414/749.1, 798.2, 414/751.1, 791.2; 209/DIG. 1, 698, 703, 588, 584, 11.5; 198/456

(56) References Cited

U.S. PATENT DOCUMENTS

| | | | | |
|---|---|---|---|---|
| 2,877,885 | * | 3/1959 | Wheeler | 198/37 |
| 3,573,748 | * | 4/1971 | Holme | 340/172.5 |
| 3,757,942 | * | 9/1973 | Gunn | 209/11.5 |
| 4,589,555 | * | 5/1986 | Hollingsworth | 209/703 |
| 4,674,934 | * | 6/1987 | Honger | 414/103 |
| 4,727,991 | * | 3/1988 | Mojden et al. | 209/588 |
| 5,086,929 | * | 2/1992 | Richter et al. | 209/698 |
| 5,097,959 | * | 3/1992 | Tilles et al. | 209/584 |
| 5,538,234 | * | 7/1996 | Yankloski | 271/11 |
| 5,954,207 | * | 9/1999 | Yamashita et al. | 209/584 |

* cited by examiner

*Primary Examiner*—Joseph A. Fischetti
(74) *Attorney, Agent, or Firm*—Ronald E. Smith; Smith & Hopen, P.A.

(57) ABSTRACT

Envelopes in a vertical orientation are delivered in sequence to an envelope bundling table from a sheet insertion table where sheets are inserted into envelopes. A stationary vertical wall forms a part of the envelope bundling table and the respective short ends of envelopes of a preselected bundle of envelopes successively abut it when discharged onto that table. A movably mounted vertical wall has a first deployed configuration where it is disposed parallel to the first vertical wall, between the sheet insertion table and the stationary vertical wall. When so deployed, the envelopes of a preselected bundle successively abut it and therefore do not reach the first vertical wall. Those envelopes are therefore laterally offset from envelopes of a different bundle that abut the first vertical wall. The movable vertical wall has a retracted position so that envelopes delivered to the envelope bundling table abut the first vertical wall when the second vertical wall is retracted. In this way, successive bundles of envelopes are laterally offset from one another so that they can be manually separated from one another and banded.

2 Claims, 1 Drawing Sheet

OFFSET SORTER FOR ENVELOPES

BACKGROUND OF THE INVENTION

1. Field of the Invention

This invention relates, generally, to an apparatus that sorts envelopes into separate bundles. More particularly, it relates to a sorter that arranges envelopes into bundles that are laterally offset from one another.

2. Description of the Prior Art

Eleven digit ZIP codes include a five digit ZIP code that identifies a geographical area, a four digit extension code that identifies a particular residence or building within that geographical area, and a two digit extension code that identifies a particular postal delivery route.

Sorting machines heretofore known sort envelopes bound for different postal delivery routes by providing a spatial separation between contiguous bundles. All of the envelopes within a particular bundle are staggered on a conveyor belt by a small amount, such as an eighth of an inch, and contiguous bundles are spaced apart from one another by an inch or so. A worker carefully observes the bundles as they arrive on a conveyor belt at an unloading station, scoops them up, and places a rubber band around them. This is a time-consuming procedure because the worker must scoop up the envelopes and jog them to place them into a neat alignment; the application of a rubber band also takes time.

One of the problems with this well-known sorting method is that envelopes are often skewed when they arrive at the worker's station. The skew is typically such that the leading end of an envelope will be positioned within a leading bundle, and the trailing end of the envelope will be positioned within a trailing bundle. Thus, a worker unloading the belt will be unsure as to which bundle a skewed envelope belongs, and time will be spent trying to identify to which bundle it belongs. This increases labor costs, and even with the expenditure of extra time, mistakes will be made.

Recent developments in the art include marking the last envelope in a bundle with a strip of red ink along its top edge to clearly identify the last envelope of a bundle. However, this requires workers to maintain the ink supply, and problems associated with the use of ink inevitably arise. Moreover, the red mark detracts from the aesthetic appeal of the mailing. For example, if an advertiser is mailing attractive envelopes, it will not be pleased that a significant number of its envelopes are being marked and rendered less attractive.

What is needed, then, is an improved means for separating contiguous bundles from one another. The improved method should produce bundles that are unambiguously separated from one another and therefore not require a worker to decide to which bundle a skewed envelope should be assigned. Nor should it require the use of ink. The improved method should reduce labor costs by eliminating the time-consuming steps of requiring a worker to scoop up bundles and to jog them before applying a rubber band around them. Instead, it should reduce the amount of labor required by producing neatly-aligned, unambiguous bundles that are ready for banding.

There are two types of machines with which an improved sorting apparatus could be used. A first type of machine inserts sheets into envelopes at a high rate of insertions per hour and delivers envelopes to a discharge table where the envelopes are then manually sorted and bundled by wrapping a rubber band around the individual bundles. A second type of machine sorts envelopes that are ready to be mailed into a plurality of bins, where each bundle sorts into an individual bin. A worker removes the bundles from a bin, places a rubber band about each bundle, and places the banded bundle in a tray for delivery to various postal carriers.

There is a need for a sorting apparatus having utility with both types of machines.

However, it was not obvious to those of ordinary skill in this art how the needed apparatus could be provided, in view of the art considered as a whole at the time the present invention was made.

SUMMARY OF THE INVENTION

The long-standing but heretofore unfulfilled need for an innovation that overcomes the limitations of the prior art is now met by a new, useful, and nonobvious apparatus for separating envelopes into bundles. It includes an envelope bundling station and an envelope delivery means for delivering envelopes in an upright configuration to the envelope bundling station.

The envelope bundling station includes a first vertical wall having a stationary position and a second vertical wall that reciprocates along its longitudinal axis between a deployed and a retracted position. When deployed, the second vertical wall is disposed in substantially parallel relation to the first vertical wall in transversely spaced relation thereto and is spaced apart from the first vertical wall by a predetermined distance.

When retracted, the second vertical wall is longitudinally spaced apart from the stationary first vertical wall. The second vertical wall is positioned at the same elevation as the first vertical wall when deployed and when retracted.

Reciprocation means are provided for alternating the second vertical wall between its deployed position and its retracted position, with the positions being changed at the end of successive bundles. In this way, successive bundles of envelopes are laterally offset from one another in an unambiguous manner so that the bundles may be manually separated from one another.

It is a primary object of this invention to provide an envelope sorting apparatus that sorts envelopes into separate eleven digit ZIP code bundles that are clearly delineated from one another.

Another object is to reduce labor and labor costs by providing a machine that eliminates the need for a worker to spend time deciding which bundle a skewed envelope may belong to.

Still another object is to reduce labor and labor costs by eliminating the need for a worker to scoop up and jog bundles of envelopes prior to banding them.

Another object is to provide a sorting apparatus that can be used in conjunction with machines that insert sheets into envelopes and addresses those envelopes at high speeds.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
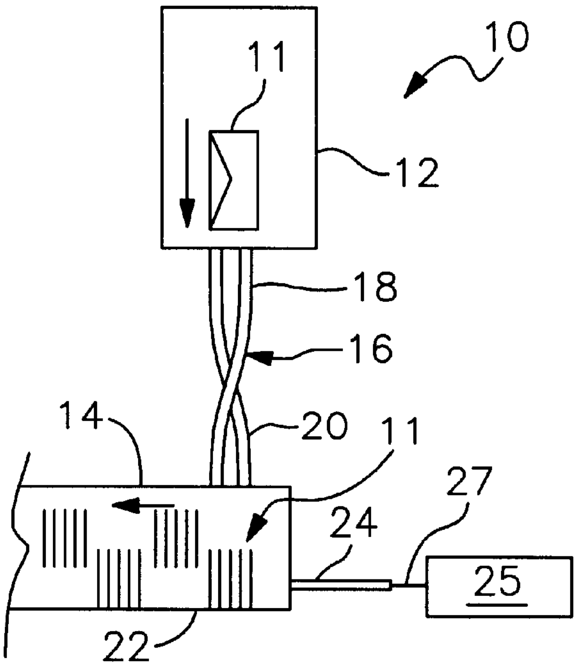
FIG. 1 is a top plan depicting a first configuration of the novel apparatus.

Referring now to FIG. 1, it will there be seen that an exemplary embodiment of the invention is denoted as a whole by the reference numeral 10.

Envelopes 11 ready to be mailed are sequentially transferred from sheet insertion table 12 to discharge table 14 by a conveyor belt means 16 that repositions each envelope from a horizontal deployment on table 12 to a vertical deployment on table 14. This is accomplished by a ninety degree twist formed in a pair of confronting conveyor belts, denoted 18 and 20. Sheet insertion table 12 and discharge table 14 lie in a common horizontal plane and both tables are stationary. Moreover, sheet insertion table 12 is disposed at a right angle relative to discharge table 14.

No such conveyor belt means is needed when the novel apparatus is used with a machine that delivers envelopes thereto that are already in a vertically oriented position.

Figure 2:
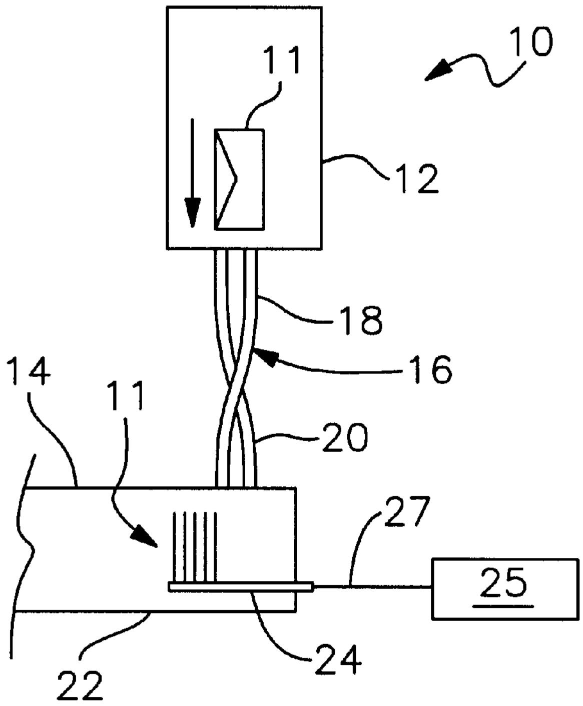
FIG. 2 is a top plan view depicting a second configuration thereof.

As best understood by comparing FIGS. 1 and 2, discharge table 14, sometimes referred to as an envelope-bundling table, includes a first, stationary vertical wall 22 against which all of the envelopes sharing a common postal route abut as they are delivered to table 14. Since the envelopes are in a vertical orientation, it should be understood that it is the short end of the envelopes that abut wall 22.

Table 14 further includes a second, movably mounted vertical wall 24 that reciprocates along its longitudinal axis between a deployed position and a retracted position. When deployed, it is disposed parallel to first vertical wall 22 and is transversely spaced apart therefrom by about an inch or so. The retracted position of second vertical wall 24 is depicted in FIG. 1 and its deployed or unretracted position is depicted in FIG. 2.

As depicted in FIG. 1, second vertical wall 24, when retracted, does not interfere with envelopes 11 as they are delivered to table 14, so that said vertically oriented envelopes abut first vertical wall 22. However, when deployed (FIG. 2), second vertical wall 24 blocks the progress of the envelopes and prevents them from reaching said first vertical wall 22 by a distance equal to the predetermined amount of transverse spacing between the first and second vertical walls. The envelope delivery means delivers envelopes to the stationary bundling table such that each envelope is disposed in a vertical configuration at a right angle to the first, stationary vertical wall when the second, movable wall is retracted and such that each envelope is disposed in a vertical configuration at a right angle to the second, movable wall when the second, movable wall is deployed. Accordingly, envelopes being delivered to the stationary envelope bundling table by the envelope delivery means remain in their respective vertical positions and abut the first vertical wall when the second, movable wall is retracted. The envelopes remain in their respective vertical positions and abut the second, movable wall when the second, movable wall is deployed.

A signal, generated by a conventional sorting machine, not shown, indicates the end of a bundle. The signal is used to activate a means 25 having an extendable and retractable actuator arm 27 connected to the outermost end of second vertical wall 24. Means 25 could be a vacuum-operated device, an electrically-operated solenoid, or the like. When deployed, the envelopes being discharged by conveyor means 16 onto envelope-bundling table 14 abut said second vertical wall 24.

Accordingly, as depicted in FIG. 1, successive contiguous bundles are laterally offset from one another. The amount of the offset is equal to the distance between said first and second vertical walls 22 and 24 and said distance may be preselected to any distance desired.

The result is a clearly demarcated, unambiguous grouping of envelopes by postal delivery routes. Each bundle is banded and delivered to a different mail carrier. When the envelopes to be bundled are first handled by a sorting machine, they are arranged to match the delivery pattern of a carrier's route. Accordingly, upon delivery to that mail carrier, no sorting of the envelopes within the bundle is needed. A sorting machine capable of such arranging of envelopes is not a part of this invention, per se, but the novel apparatus works in conjunction therewith so that all envelopes sorted by the machine are bundled in accordance with the teachings of this invention.

This invention represents a major breakthrough in the art of bundling envelopes. Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for separating envelopes into bundles, comprising:

a stationary envelope bundling table;

envelope delivery means for delivering envelopes in a vertical configuration to said stationary envelope bundling table;

said stationary envelope bundling table and said envelope delivery means being disposed in a common horizontal plane;

said stationary envelope bundling table and said envelope delivery means being disposed at a substantially right angle to one another;

a first, stationary vertical wall forming a part of said stationary envelope bundling table;

a second, movable vertical wall forming a part of said stationary envelope bundling table;

said second, movable vertical wall having a deployed position where it is disposed in substantially parallel relation to said first vertical wall and is transversely spaced apart therefrom by a predetermined distance;

said second, movable vertical wall having a retracted position where it is longitudinally offset from said first vertical wall;

said second, movable vertical wall remaining in said substantially parallel relation to said first vertical wall when said second, movable vertical wall is in said retracted position;

means for alternating said second, movable vertical wall between said deployed position and said retracted position;

said envelope delivery means delivering envelopes to said stationary bundling table such that each envelope is disposed in a vertical configuration at a right angle to said first, stationary vertical wall when said second, movable wall is retracted and such that each envelope is disposed in a vertical configuration at a right angle to said second, movable wall when said second, movable wall is deployed;

said envelopes being delivered to said stationary envelope bundling table by said envelope delivery means and said envelopes remaining in their respective vertical positions and abutting said first vertical wall when said second vertical wall is retracted and said envelopes remaining in their respective vertical positions and abutting said second vertical wall when said second vertical wall is deployed; and successive bundles of vertically configured envelopes being transversely offset from one another in an unambiguous manner so that said bundles may be manually separated from one another for banding.

2. The apparatus of claim 1, wherein said means for retracting and deploying said second vertical wall is a vacuum-operated means.

* * * * *